Sept. 6, 1966 F. O. SKIDMORE 3,270,794
TIRE COOLING

Filed Dec. 15, 1964 3 Sheets-Sheet 1

INVENTOR.
FRANK O. SKIDMORE

BY Oldham & Oldham

ATTYS.

INVENTOR.
FRANK O. SKIDMORE
BY
Oldham & Oldham
ATTYS.

Sept. 6, 1966 F. O. SKIDMORE 3,270,794
TIRE COOLING

Filed Dec. 15, 1964 3 Sheets-Sheet 3

INVENTOR.
FRANK O. SKIDMORE
BY Oldham & Oldham
ATTYS.

United States Patent Office 3,270,794
Patented Sept. 6, 1966

3,270,794
TIRE COOLING
Frank O. Skidmore, 2513 3rd St., Cuyahoga Falls, Ohio
Filed Dec. 15, 1964, Ser. No. 418,515
14 Claims. (Cl. 152—153)

This invention relates to a tire cooling means, and more particularly to a novel tire, to a novel tube, and/or to means placed internally of a pneumatic tire to effectively transfer heat from the crown and shoulder portions to the sidewalls and the mounting rim during rotational operation thereof.

Heretofore, it is well known that there have been many and various attempts made at external means to effect cooling of pneumatic tires. These prior art attempts do recognize that a rubber tire tends to become very hot, particularly in the tread, crown, and shoulder area portions during operation thereof, and more particularly operation at high speed on a fairly hot pavement. It has been shown by many and various tests that the ability to cool the tread and shoulder area rubber will greatly enhance the wear life of the tire, as well as preventing layer separation leading to blowouts. These prior art patents utilizing external cooling means have not proven highly effective, and have been expensive and cumbersome to install. Specifically, they have been too expensive to merit installation on automobile tires now in use today.

Nevertheless, it is a known fact that the mileage obtainable with an automobile, truck, or bus pneumatic tire may be greatly increased by being able to cool the temperature of tread and shoulder area portions during operation thereof at high speed. For example, a reduction in the operating temperature at the tread and shoulder area portions of between about ten and about twenty percent will in most cases increase the wear life of the tire between about fifty and one hundred percent. Thus, a simple, highly effective means to cool the tread, crown, and shoulder area portions of tires during operation thereof is needed by the art.

Therefore, it is the general object of the invention to overcome and avoid the foregoing and other difficulties of and objections to prior art practices by the provisions of means positioned internally of an inflated pneumatic tire to effect circulation of the fluid therein pressuring the tire to effectively transfer heat from the tread, crown, and shoulder area portions to the sidewalls and mounting rim.

A further object of the invention is to provide a novel tubeless type pneumatic tire wherein a plurality of raised unitary ribs form a spiral pattern around the inner surface of the tire extending about ¾ of the circumferential length thereof to effect a spiral circulation of the fluid pressuring the tire during rotational operation thereof to effectively transfer heat from the tread and shoulder portions to the sidewalls and mounting rim.

A further object of the invention is to provide a flexible flattened tube-like passage mounted to the inner surface of a tubeless pneumatic tire substantially opposite the tread and shoulder portions thereof which contains a plurality of holes facing substantially radially inwardly around the circumferential length so that fluid therein will be forced out through the holes as the passage is compressed somewhat as a bellows effect when it passes through the footprint area of a rotating pneumatic tire during operation thereof on a vehicle to effectively transfer heat from the shoulder and tread portion to the sidewalls and mounting rim.

A further object of the invention is to increase the density of fluid inflating a pneumatic tire to increase the heat conduction properties thereof to provide a better heat transfer medium from the hotter tread and shoulder area portions of a pneumatic tire to the sidewalls and mounting rim during rotational operation thereof on a vehicle.

Another object of the invention is to provide a pneumatic tire pressured with a fluid having a high density utilized in combination with internal means to effect circulation or agitation of the pressured fluid to effectively transfer heat from the tread and shoulder area portion to the sidewalls and mounting rim during rotational operation of the tire on a vehicle.

A further object of the invention is to provide means operatively attached to a rim mounting a pneumatic tubeless tire, which means is positioned internally of the fluid pressure cavity, and extends circumferentially around the rim to transfer the fluid pressure in small puffs or jet streams directed substantially radially outwardly into the tire during rotational operation thereof on a vehicle to effectively force the cooler air adjacent the rim and sidewall portions towards the tread and shoulder portions of the tire to effect cooling thereof.

A further object of the invention is to provide a novel tube for a tube type pneumatic tire which has a plurality of raised ribs extending in a helical spiral manner circumferentially thereof, which ribs will direct the fluid pressure in a spiral circulatory movement during rotational operation of a tire carrying the tube to effectively cool the tread and shoulder area portions of the tire by transferring the heat to the sidewalls and mounting rim.

A further object of the invention is to provide means mounted internally of a pneumatic tire to continuously effectively circulate the fluid utilized for pressurization thereof from the tread portion in a path passing the sidewalls and the mounting rim during rotational operation of the tire.

The aforesaid objects of the invention and other objects which will become apparent as the description proceeds are achieved by providing in combination, a one-piece drop center rim, the rim having a well and substantially horizontal bead receiving flanges extending laterally from the well and integral therewith, tire bead retaining flanges extending substantially vertically from the edges of the bead receiving flanges and integral therewith, a wheel secured to the well of the rim, a pneumatic tire having a tread and sidewalls mounted on the rim and secured by the tire bead retaining flanges, and means operatively mounted within the cavity defined by the tire and the rim to effectively agitate and circulate the fluid providing pressure to the tire during rotational operation thereof to transfer heat generated at the tread to the sidewalls and the rim.

For a better understanding of the invention reference should be had to the accompanying drawings wherein.

While it should be understood that the principles of the invention are adaptable to truck and bus pneumatic tires, and to tube type pneumatic tires, the features of the invention are particularly adaptable to tubeless type automobile tires, and hence it has been so illustrated and will be so described.

*Cooling means fixed to rim*

Figure 1:
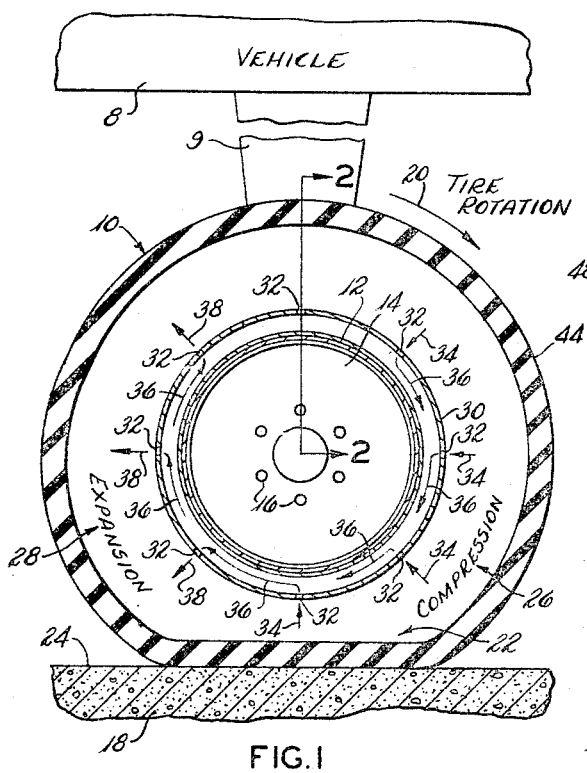
FIGURE 1 is a vertical cross sectional view of a tubeless type pneumatic tire shown in rotating operating condition on the pavement, as carried by a vehicle which view illustrates one embodiment of the invention mounted to the rim internally to the tire to effect agitation and circulation of the fluid pressuring the tire.

With reference to the form of the invention illustrated in FIGURE 1 of the drawings, the numeral 10 indicates generally a tubeless type pneumatic tire mounted to a conventional drop center rim 12, in the usual manner. The tire 10 is used to facilitate movement of a vehicle 8 and is mounted thereto by a support 9. The rim 12 has a drop center flange 14 with a plurality of bolt holes 16 adapted to mount over the brake hub of an automobile. It should be noted that the tire 10 is indicated in an operating condition as being loaded and passing over a roadway pavement 18 in a direction indicated by a tire rotation arrow 20. An exaggerated footprint area 22 is indicated along that point where the tire 10 contacts the surface 24 of the pavement 18. It should be understood that at high speed a tire rotating in the direction indicated by the arrow 20 and having a footprint area indicated by the area 22 will result in a specific area of fluid compression, as indicated by the numeral 26, while an area of expansion will be experienced in that portion of the internal area of the tire indicated by the numeral 28. The tire 10 will actually have a shorter radius from the tread portion to the center of the rim or hub 14 throughout the area of compression 26 than it will throughout the area of expansion 28. This is caused partially by the centrifugal force of the tire rotation, partially by the load on the tire, and partially by the forward movement of the vehicle carrying the tire. In other words, a bellows effect is constantly in action on the tire 10 causing the areas of compression 26 and expansion 28.

Therefore, in this embodiment, the objects of the invention are achieved by utilizing the compression area 26 and the expansion area 28 in conjunction with an endless tube 30 mounted in substantially fixed relationship to the rim 12 and extending circumferentially therearound. The tube 30 is provided with a plurality of small holes, indicated generally by numeral 32, at substantially equally spaced circumferential distances therearound. While the invention contemplates that the holes may be directed substantially radially outwardly, the direction is not of critical importance. The invention further contemplates that the holes may be between about ⅛ to about ½ inch in diameter, with between about 4 to about 24 holes spaced therearound. Preferably, it appears that a satisfactory fluid agitation and circulation is obtained utilizing eight ¼ inch holes.

During rotational operation of the tire 10, the area of compression 26 will force fluid in through the holes 32 in the tube 30, as indicated generally by the arrows 34. The fluid forced in to the tube 30 as indicated by the arrows 34 causes a flow of fluid in the tube 30 as indicated by the arrows 36. This fluid flow will extend around to the area of expansion 28 causing small puffs or jets of fluid to be expelled therefrom, as indicated by the arrows 38. These puffs or jets of fluid 38 will effectively force the substantially cooler air around the sidewalls of the tire 10 and the rim 12 upwardly and toward the hotter portion around the tread of the tire 10 effectively providing cooling thereof. The agitation to the fluid providing pressure to the tire 10 especially of the cooler fluid near the rim toward the tread in effect causes transfer of the heat generated at the tread and shoulder portions to the sidewalls and rim 12.

While it should be understood that the fluid normally associated to inflate a pneumatic tire is simply air, this air does have weight and will experience fluid friction. Thus, during the rotational operation of a tire, the air will tend to be thrown centrifugally outwardly against the tire so that there is generally very little movement from the air layer adjacent the outward surface of the tire back and inwardly to effect heat transfer therefrom. Therefore, any means to agitate or effect circulation or movement of the air within a tire will transfer some heat from the tread, crown, and shoulder area portions back to the sidewall and mounting rim. Under operational tests, a tube operatively mounted to the rim in the manner illustrated in FIGURE 1 has been shown to provide between about a 10% to about a 25% decrease in the normal running temperatures at the tread and shoulder area portions of a tubeless pneumatic tire.

Figure 2:
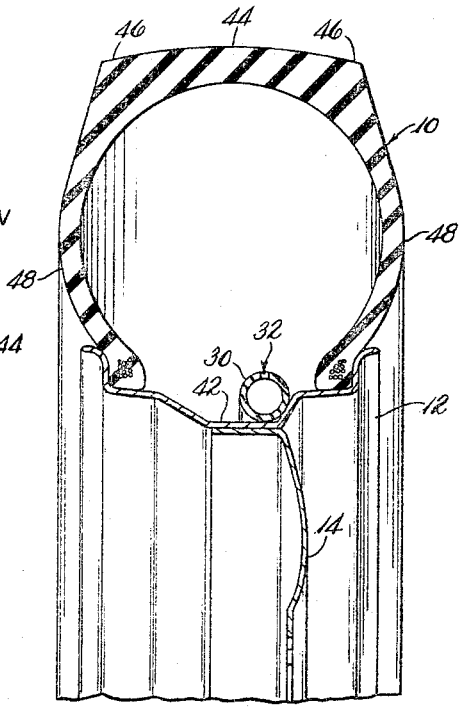
FIGURE 2 is an enlarged vertical cross sectional view of the tire of FIGURE 1 more specifically showing the location of the fluid agitation and pressuring means, as taken on line 2—2 of FIGURE 1.

Referring now to the vertical cross sectional view of the tire, as shown in FIGURE 2, the position of the tube 30 relative to a well 42 of the rim 12 is clearly shown. The tube 30 may be made of any suitable material such as metal or plastic, and is secured in place by suitable adhesive welds, spring tension, or other convenient means. It should be noted that the only hole 32 being visible in this figure is directed substantially radially outwardly so as to puff or force fluid under pressure towards a tread portion 44 or shoulder portions 46 for the tire 10 to effect cooling thereof. Some representative operating temperatures for a tire and wheel combination shown in FIGURES 1 and 2 for wheel rotation at about 70 m.p.h. with the outside air temperature at about 70° would be approximately 180° F. at the tread portion 44, 200° F. at shoulder portions 46, about 125° F. at sidewall portions 48, about 100° F. on the rim 12, and about 90° F. on the drop center flange 14. During rotational operation of the tire 10 utilizing the tube 30 to effect agitation and circulation of fluid pressuring the tire, the temperature at the crown portions 46 will be reduced to about 180° F., while at the tread portion 44 the temperature will reduce to about 160° F. Conversely, the temperature at the sidewall portions will increase to about 135° F., at the rim portion 12 will increase to about 115° F. and the drop center flange 14 will increase to about 105° F. Thus, the critical tread and shoulder area portions of the tire 10 will be reduced in operating temperature eliminating, or reducing the possibilities of layer separations, and tread wear thereby greatly increasing the life of the tire, and eliminating, or reducing the possibility of blowouts.

Figure 3:
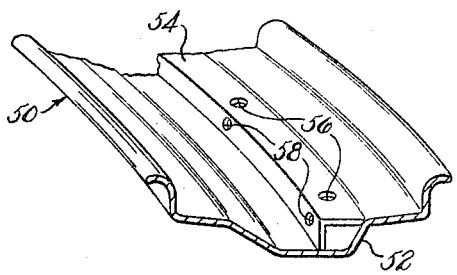
FIGURE 3 is an enlarged vertical cross sectional perspective view of a modified embodiment of the invention shown in FIGURES 1 and 2.

Referring now to the modification of the invention as shown in FIGURE 3, the numeral 50 indicates generally a rim having a well 52 formed therein with an L-shaped metal member 54 welded into position on the well 52 so as to effectively create an endless hollow chamber extending circumferentially around the well 52. Thus, usually a seam weld along each edge of the member 54 will be used to effect positioning thereof, although other suitable securing means might be used. A plurality of holes 56 may be provided on the top of the member 54, and other holes 58 may be directed from the side thereof. Again, the operation of this modification is similar to that described for the tube 30 with reference to FIGURES 1 and 2. Fluid under pressure in a tubelesss pneumatic tire will be forced into the holes on the compression section, or side of the tire during rotational operation of the tire wheel combination and forced outwardly through the holes in puffs or jets on the expansion side. This modification merely represents what might be a simpler manufacturing process for wheel and rim manufacturers, than that disclosed by the separate tube 30 in FIGURES 1 and 2.

A tire attached embodiment

Figure 4:
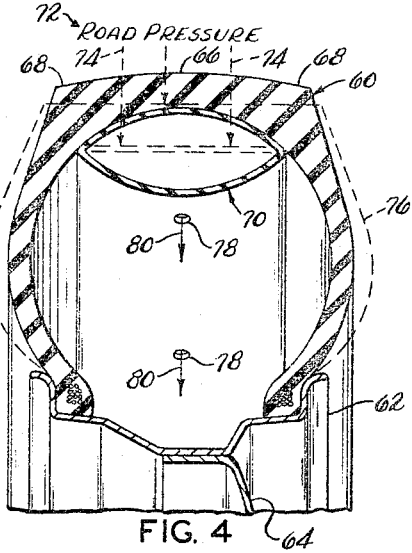
FIGURE 4 is an enlarged vertical cross sectional view of a form of the invention utilizing a flexible flattened tube-like liner mounted to the inside of a tubeless pneumatic tire substantially opposite the tread portion to act as a bellows during rotational operation of the tire to effect fluid agitation and circulation from an entirely internal source.

Referring now to the embodiment of the invention illustrated in FIGURE 4, the numeral 60 indicates generally a tubeless type pneumatic tire mounted in the normal manner to a rim 62 having a drop center flange 64. Cooling of a tread portion 66 and shoulders 68 of the tire 60 may be accomplished by providing a substantially flattened flexible tubing 70 operatively positioned by suitable adhesive on the inside of the tire 60 substantially adjacent to the tread portion 66. The tubing 70, will normally be made from a relatively stiff rubber or plastic, so that it will substantially hold its shape during rotational operation of the tire wheel combination, except for that area where is passes through the footprint portion. In this case, road pressure 72, as indicated by the dotted lines 74, will cause a deflection of the tube 60, as indicated by the dotted lines 76. This deflection radially inwardly towards the rim 62 which could more properly be called a bellows effect will in effect flatten out the tubing 70 further thereby forcing fluid through a plurality of holes 78 through the radially inner side thereof so that small jets or puffs of fluid under pressure, as indicated by the arrows 80 will be forced out along a substantial arcuate area in the vicinity of the footprint of the tire continuously at it rotates. In essence, it is believed that this fluid which will be forced out because of the deflection of the tire causing a flattening of the tubing 70 will be relatively hot compared to the remaining fluid in the tire 60, but that this will be replaced by cooling air as the agitation and circulation of the fluid will continuously be accomplished by the tubing.

Thus, it should be undersood that the same principle as set forth above with reference to FIGURES 1 through 3 is applicable to this embodiment of the invention. Similar cooling results will be possible. The number of holes 78 and their spacing circumferentially around the inside of the tire 60 will be dependent upon the exact operating conditions, and the tire being utilized. Any desired number of the holes 78 may be used, depending upon their diameter and circumferential or other spacing.

Rib type cooling principle

Figure 5:
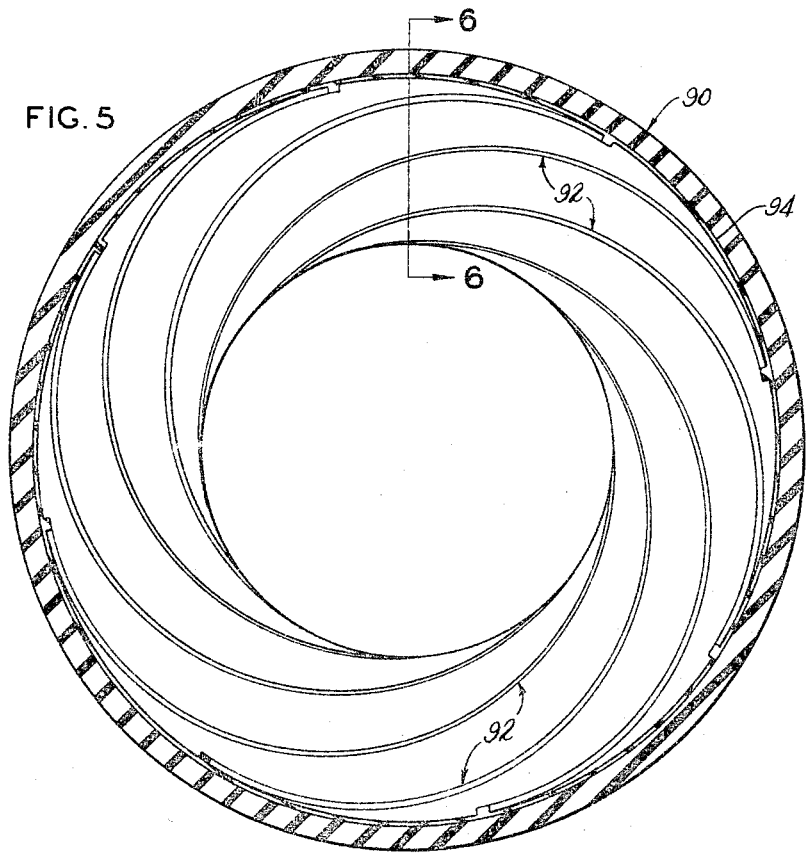
FIGURE 5 is an enlarged vertical cross sectional plan view of a tire employing a plurality of spirally wound substantially circumferentially extending raised ribs which achieve a spiral circulation of fluid pressuring the tire during rotational operation thereof.
Figure 6:
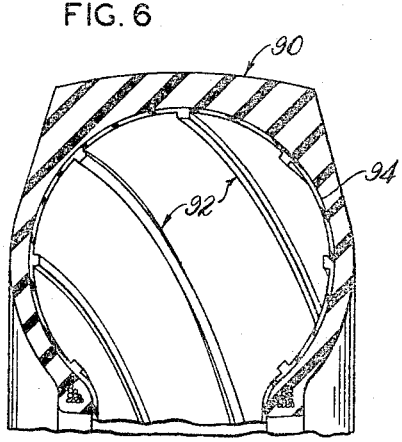
FIGURE 6 is an enlarged vertical cross sectional view of the tire of FIGURE 5 taken substantially on line 6—6 thereof.
Figure 7:
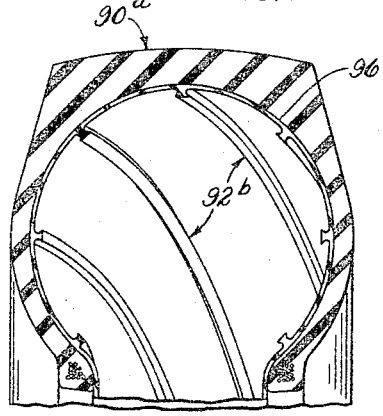
FIGURE 7 is a vertical cross sectional view of a tire, similar to FIGURE 6, but utilizing raised ribs having a concave cross sectional configuration to also effect a helical spiraling circulation to the fluid effecting pressuring thereof during rotational operation.

An embodiment of the invention particularly adaptable to either tube or tubeless type tires, and which might be the most economically feasible, and probably the most effective method of cooling the tread and shoulder area portions of a tire is illustrated in FIGURES 5 through 7. More specifically, with reference to FIGURE 5 the numeral 90 indicates generally a pneumatic tire. A plurality of raised ribs indicated generally by numeral 92 are formed on the inside surface of the tire, if tubeless, or on the inside surface of a tube, if a tube is necessary. The raised ribs 92, may be of generally square cross sectional shape, although a concave cross sectional shape on each side thereof, or on only one side thereof, as particularly shown in FIGURE 7, might be more desirable. The ribs 92 extend in a helically spiral arrangement around the inside surface of the tire from one sidewall to the other. It is contemplated that each rib 92 will extend a substantial distance of the circumference of the tire, generally more than half, but preferably less than half the full circumference. The ribs 92 will generally be equally spaced around the circumference so as to give a uniform helical spiral shape when looked at in total, for example as shown in FIGURES 6 and 7 by the ribs 92 and 92b respectively.

The exact size and cross sectional configuration of the ribs 92 will be dependent on the size of the tire, and the desired amount of circulation of the fluid providing pressure thereto. For example, the ribs might be between about ⅛ inch high to about ½ inch high, and between about ⅛ inch in width to about 1 inch in width. It is believed that the ribs must have a thick and substantial base so that they will not break loose or be torn out of position during rough operational use of the tire with which they are associated.

In rotational operation a pneumatic tire, such as the tire 90 in FIGURE 5, will normally be inflated with air, which has some weight. The weight of the air will tend to throw it outwardly against the tread and shoulder area surface because of centrifugal force during rotational operation. Fluid friction between the skin of the tire 90 and the air will tend to drag the air along at substantially the same rotational speed as the tire 90. However, because of the necessary losses in fluid friction, and the up and down land surface speed normally associated with vehicular travel, the fluid pressure mass will not rotate at exactly the same speed as the tire. Thus, there is some relative circumferential movement between the fluid pressuring the pneumatic tire 90 and the tire itself. Thus, the purpose of the raised ribs 92 is to take advantage of the relative movement between the fluid pressuring the tire 90 and the tire itself by causing the fluid to follow the path of the ribs 92 during this relative movement effecting a corkscrew or helical twisting circulatory movement to the fluid under pressure as it moves relative to the tire during rotational operation thereof. This also might be described as a circulatory rotation of the fluid under pressure about the toric axis of the tire. Thus, in this manner, the hot air or fluid adjacent the tread, crown, and shoulder portions will be swirled or circulated down adjacent to the sidewalls and rim portions to effectively transfer its heat through and to these portions so that when it again swirls and circulates back past the tread and shoulder portions, it will be cooled and effect a cooling to these portions of the tire. Testing utilizing this design, with a substantially rectangular cross sectional shape to the raised ribs, has proven that at least about a 5% to about a 10% heat reduction in the tread and shoulder portions of a pneumatic tire may be obtained because of the internal circulation of the air or fluid under pressure in the pneumatic tire during rotational operation thereof.

FIGURE 6 illustrates the raised ribs 92 which have been formed from a rubber layer 94 normally associated with a tubeless type pneumatic tire, and in essence acting as the tube. Note, also, that the helical coiled arrangement of the ribs 92 is at a relatively shallow angle to provide a slow torsional or twisting or corkscrew motion to fluid under pressure in the tire as it moves relative to the tire 90. FIGURE 7 illustrates an inflatable inner tube 96 associated with a tube type pneumatic tire 90a, which tube 96 has been formed with a plurality of raised internal ribs 92b having concaved shaped sides. Further, it should be noted that the angular or helical relation of the ribs 92b is at a greater angle relative to the plane of the tire 90a than that of the ribs 92 as shown in FIGURE 6.

As stated above, the angular relationship of the ribs, is dependent upon their circumferential extending length, and will be dependent upon the desired amount of cooling, the type of tire, and other factors. It has been found in practical experimental use involving this principle that eight raised ribs extending substantially about 75% of the circumferential distance around the radially inner surface of a tubeless pneumatic tire provides between about a 10 to about 20 percent reduction in the operating temperature at the tread and shoulder areas of the pneumatic tire. Another mathematical formula which has proved some merit in determining the angular relationship of the ribs, is that the rib length should be about 3½ times the distance from the bead to the crown of the tire, with this distance measured around the bead circumference. Thus, the rib would extend from the bead on one side a length substantially 3½ times the radial distance from the bead to the crown of the tire and terminate at the bead on the other side of the tire.

It would be a simple process to form the curing bags now utilized in vulcanizing tubeless type pneumatic tires to carry recessed grooves therein so that the separate layer of uncured rubber acting as an inner tube in a tubeless tire, such as the layer 94 in FIGURE 6, may be thus formed by the grooves in the curing bag to provide the desirable raised ribs. Further, since these raised ribs are designed to be made from a resilient type rubber, they could conceivably be formed in a concave shape in cross section, such as the ribs 92b in FIGURE 7, and still be removable from a recessed groove in the curing bag normally associated with the vulcanizing process.

With reference to the tube 96 formed with the ribs 92b, as shown in FIGURE 7, it is believed that this type of tube could be easily extruded so as to conveniently, and inexpensively provide raised ribs having the desired cross sectional shape.

Thus, it is seen that the principle of raised ribs extending in a substantially spiral direction around the inside of a pneumatic tire, or the inside of a tube, will circulate the air or fluid under pressure in a pneumatic tire in a corkscrew or helically spiral direction to effectively transfer heat away from the tread, crown, and shoulder area portion of the tire to the sidewall and mounting rim to thereby increase tire life, and prevent the possibility of layer separations leading to blowouts.

Separate insert means

Figure 8:
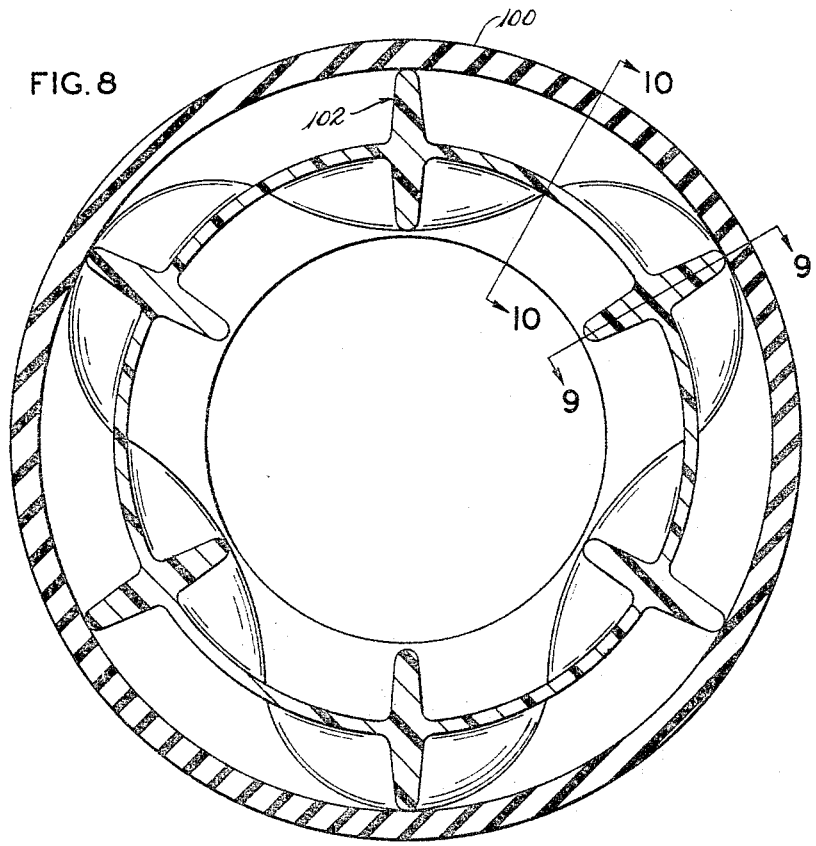
FIGURE 8 is an enlarged vertical cross-sectional plan view of a tire employing an endless spiral corkscrew shaped insert to achieve a spiral circulation of fluid pressuring the tire during rotational operation thereof.
Figure 9:
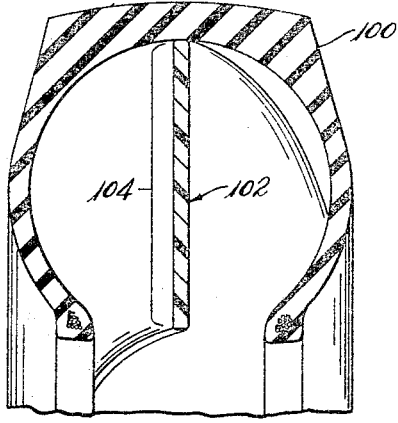
FIGURE 9 is a vertical cross sectional view, partially broken away, of the tire and insert of FIGURE 8 taken on line 9—9 thereof.
Figure 10:
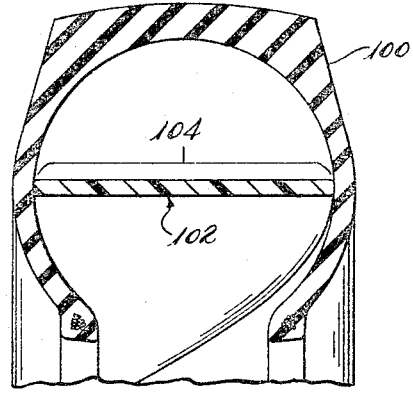
FIGURE 10 is a vertical cross sectional view, partially broken away, of the tire and insert of FIGURE 8 taken on line 10—10 thereof.

FIGURES 8 through 10 of the drawings illustrate a pneumatic tire 100 having a separate flexible insert, indicated generally by numeral 102, positioned therein. The insert 102 is preferably made in endless form from a substantially flat sheet of flexible plastic or rubber based material and formed with a corkscrew type spiral twist throughout its circumference. In other words, the insert 102 could be compared to an endless screw thread where the flights of the screw will direct the fluid pressuring the tire 100 in a spiral circulatory path during rotational operation thereof. Of course, the pitch of the flights might be varied as necessary so as to provide fluid circulation for the optimum cooling results to the tire 102. It is anticipated that the insert 102 will be readily moldable or extrudable from a suitable plastic or rubber composition at a low cost. Further, in order to provide a secure fit of the insert 102 within the tire 100 it is contemplated that the width of the flights, as measured by the distance 104 in FIGURES 9 and 10, will be slightly greater than the inside substantially circular vertical cross sectional shape of the tire 100. The flexible resilience of the material used in the insert 102 will allow ready adaptation to the change in shape of the tire 100 as it passes through the footprint during operational use. Further, such resilience plus a relative soft composition to the material of the insert 102 will prevent any wear by frictional rubbing on the inside of the tire 100.

FIGURES 9 and 10 illustrate the twisting spiral shape of the insert 102 as it passes around the circumference of the tire 102. Although the insert 102 would only be preferable for use with tubeless type pneumatic tires, it is anticipated that it would be possible to build or extrude an inflatable inner tube having an endless fixed flap which essentially defined the same corkscrew spiral screw flight effect as the insert 102 so as to provide a spiral circulatory movement of the air pressurizing the tube. Thus, the principle of the insert 102 is also applicable to an inflatable inner tube.

Increasing the density gradient of the fluid pressure in a pneumatic tire

The invention further contemplates that introduction of a suitable liquid or gaseous coolant into a pneumatic tire in combination with the air normally used for inflation, which coolant will substantially increase the density of the fluid in the tire to enhance heat conduction, will meet the objectives of the invention. The proportions of the mixture to achieve the desired density will depend on the specific cooling conditions required. Specifically, it is well known that silver conducts heat much faster and much better than cast iron. Similary, if the fluid pressuring a pneumatic tire has heat conduction properties greater than air, which is now normally used, it will help to greatly equalize temperature varience from the tread, crown, and shoulder area portions of a pneumatic tire to the sidewalls and mounting rim, thereby in effect cooling the tread, crown, and shoulder area portions. As stated above, for a normal passenger type pneumatic tire operating at about 70 m.p.h. in 70° F. air temperature, the tread and crown portion will run at approximately 180° F., with the shoulder portions running at about 200° F. This constrasts with a 125° F. temperature at the sidewalls, and about 115° F. temperature for the rim. Naturally, according to the laws of physics, these temperatures will attempt to stabilize and thereby equalize. Certainly, increasing the heat conduction properties of the fluid pressuring the tire will enhance this equalization and stabilization, and result in a lowering of the temperature of the tread and shoulder area portions of the tire, while raising the temperature of the sidewall and rim portion.

Also, the introduction of a small amount of aluminum powder internally of the pneumatic tire, which would flow or agitate with circulation of the fluid pressuring the tire would enhance the heat conduction properties within the tire to thereby increase the cooling effect to the tread and shoulder area portions.

The invention further contemplates that this liquid or gaseous coolant might effectively operate in a pneumatic tire wheel combination without any of the structural embodiments of the invention described above. However, it is believed that this coolant utilized in conjunction with any of the embodiments described and shown with reference to FIGURES 1 through 10 above will further enhance the cooling features achieved by the specific embodiments of the invention. It is believed, for example, that a liquid coolant such as Freon T.F. manufactured by the E. I. du Pont de Nemours & Co., which is a noninflammable coolant that boils at 117.6° F. and will not condense again during normal operating temperatures for pneumatic tired vehicles might be adequate. For example, a mixture of about 20% Freon T.F. with 80% air to pressure a tire would achieve the objects of the invention in some cases. Thus, this coolant will effectively increase the density of the fluid pressure inside the pneumatic tire thereby achieving the desired heat conduction properties to more uniformly distribute the heat in the tire to effectively reduce the temperature at the tread and shoulder area portions. Other suitable coolants having high specific gravities will also achieve this desired object.

Of course, a purely liquid coolant in a sufficient quantity to only form a thin layer on the inner surface of a pneumatic tire by centrifugal force during rotational operation thereof which would only pass in the corkscrew or helically spiral circulatory path as defined by the raised ribs might probably have much greater heat transfer qualities than air alone or an atmosphere of increased density.

Thus, it is seen that the objects of the invention have been achieved by providing means associated internally with pneumatic tubeless type or tube type tires to effect agitation or circulation of the fluid pressuring the tire to effectively transfer heat from the shoulder crown, and tread portion to the sidewalls and mounting rim. These fluid circulation techniques can be augmented with introduction of a liquid or gaseous coolant to increase the density of the fluid pressure inside the tire thereby enhancing heat conduction properties, or the coolant may be utilized alone. The raised rib technique of effecting a swirling, corkscrew, or helical twisting movement to the fluid pressure within the tire may be readily applicable to both a tubeless type and tube type pneumatic tire.

While in accordance with the patent statutes only the best known embodiments of the invention have been illustrated and described in detail, it is to be particularly understood that the invention is not limited thereto or thereby, but that the inventive scope is defined in the appended claims.

What is claimed is:

1. In combination,
    a standard one-piece drop center rim, said rim having a closed flat well and substantially horizontal bead receiving flanges extending laterally from the well and integral therewith,
    tire bead retaining flanges extending substantially vertically from the edges of the bead receiving flanges and integral therewith,
    a radially inwardly projecting wheel secured to the well of the rim,
    a pneumatic tire having a tread and sidewalls mounted in fluid tight relation on the rim and secured by the tire bead retaining flanges, and
    means operatively mounted within the fluid tight cavity defined by the tire and the rim to effectively agitate the fluid providing pressure to the tire during rotational operation thereof to transfer heat generated at the tread to the sidewalls and the rim.

2. A combination according to claim 1 where the pneumatic tire is a tubeless type and where said means comprises an endless tube operatively positioned on the rim within the enclosure defined by the tire and the wheel with a plurality of holes equally spaced along its circumferential length and directed at random directions to effectively transfer pressure from the area of compression and the tire caused by the bellows effect during rotational operation thereof to the area of expansion in fluid jet streams from the holes in the tube which fluid agitation effectively increases heat transfer from the crown and shoulder area of the tire to the sidewalls and the rim.

3. In combination,
    a wheel having a rim,
    a pneumatic tire having a crown, sidewalls, and endless inextensible bead means on each side thereof mounted on the rim, and
    a plurality of raised ribs operatively positioned on the radially inner surface of the tire and extending into the enclosure defined by the tire and the wheel, said ribs being spaced circumferentially relative to each other and defining a substantially helical spiral shape on the radially inner surface of the tire whereby the air inflating the tire is circulated in a helical spiral pattern about the toric axis of the tire during rotational operation of the tire thereby drawing heat away from the crown and shoulder areas and transferring it through the sidewalls and to the rim.

4. A combination as defined in claim 3 where each of the raised ribs extends circumferentially from the bead means on one side of the tire to the bead means on the other at least half the circumferential distance of the tire, but less than the full circumferential distance of the tire.

5. A combination according to claim 3 where the raised ribs will be between about 1/8 to 1/2 inch in height and between about 1/8 and 1 inch in thickness of substantially rectangular shape in cross section with a base wider than their height.

6. A combination according to claim 3 where both sides of the raised ribs are substantially concave shaped to more readily direct gaseous fluid flow without turbulence in a smooth manner to effectively transfer heat from the tread and shoulder area portion of the tire to the sidewalls and mounting rim.

7. A combination according to claim 3 where the angle of the raised ribs defining the helical spiral shape relative to the tire is dependent upon their circumferential length around the tire, and where the number of ribs and the circumferential length of the ribs may be appropriately varied to provide the desired helical spiral circulatory movement to the fluid under pressure within the tire about the toric axis thereof during rotational operation of the tire.

8. A pneumatic tire having a tread, crown, shoulder area portions, sidewalls and an endless bead around the internal circumference on each side thereof which includes a plurality of raised ribs formed as a unit with the tire on the internal surface thereof, each rib being substantially equally spaced around the circumference of the tire and extending in a helical spiral shape substantially from one endless bead a circumferential distance around the tire to the other bead.

9. In combination,
    metal wheel means,
    non-metallic pneumatic tire means mounted on the wheel means,
    an inflatable tube means positioned within the tire means,
    a fluid under pressure in the tube means which fluid moves circumferentially relative to the tire means upon rotational movement thereof, and
    means internally of the tube means for moving the fluid rotatively about the toric axis of the tube means and upon the relative circumferential movement of the fluid in the tube means to transfer heat away from the tread, shoulder, and sidewall areas of the tire means.

10. In combination,
    a standard one-piece drop center rim, said rim having a closed flat well and substantially horizontal bead receiving flanges extending laterally from the well and integral therewith,
    tire bead retaining flanges extending substantially vertically from the edges of the bead receiving flanges and integral therewith,
    a radially inwardly projecting wheel secured to the well of the rim,
    a pneumatic tire having a tread and sidewalls mounted in fluid tight relation on the rim and secured by the tire bead retaining flanges, and
    means operatively positioned within the closure defined by the tire and the wheel means to transfer fluid in substantially radially outwardly directed puffed jet streams from substantially adjacent the rim utilizing the energy transfer from the area of compression to the area of expansion caused by the bellows action of the tire during loaded rotational operation thereof.

11. A combination according to claim 10 where said means is an endless substantially closed passage extending circumferentially around the rim which has a plurality of holes spaced therearound and directed at random with respect to the inside of the tire substantially opposite the tread and shoulder area portions.

12. In combination,
    a standard one-piece drop center rim, said rim having a closed flat well in substantially horizontal bead receiving flanges extending laterally from the well and integral therewith,
    tire bead retaining flanges extending substantially vertically from the edges of the bead receiving flanges and integral therewith,
    a radially inwardly projecting wheel secured to the well of the rim,
    a pneumatic tire having a crown, a shoulder area, and sidewalls mounted on the rim and inflated with a gaseous fluid, and retained on the rim by the bead retaining flanges, and an endless flexible insert positioned inside the tire, said insert being slightly larger than the cross sectional area inside the tire so as to be held in position by friction therebetween, said insert being a flat ribbon-like resilient material twisted to form a corkscrew spiral shape and having its ends affixed to thereby make the insert endless, said insert effectively causing a spiral circulatory movement of the gaseous fluid inflating the tire during rotational operation thereof to effectively transfer heat from the crown and shoulder areas to the sidewalls and rim.

13. In combination, a standard one-piece drop center rim, said rim having a closed flat well in substantially horizontal bead receiving flanges extending laterally from the well and integral therewith, tire bead retaining flanges extending substantially vertically from the edges of the bead receiving flanges and integral therewith, a radially inwardly projecting wheel secured to the well of the rim, a pneumatic tire having a crown, a shoulder area, and sidewalls mounted on the rim and retained by the bead retaining flanges, an inflatable inner tube positioned inside the tire to provide support thereto when inflated with the fluid under pressure, and a flap dividing the tube into two compartments, said flap passing around the circumference of the tube in a twisted corkscrew fashion whereby the fluid under pressure in the tube is circulated in a spiral fashion during rotational operation of the tire to effectively transfer heat from the crown and shoulder areas to the sidewalls and rim.

14. In combination, a wheel having a rim, a pneumatic tire having a crown, a shoulder area, and sidewalls mounted on the rim and inflated with a gaseous fluid, a plurality of raised ribs wound in a helical spiral fashion around the radially inner surface of the tire and secured thereto to effectively increase circulation of any fluid within the tire to draw heat away from the crown and shoulder area and transfer it through the sidewalls into the rim, and low temperature boiling fluid coolant means of greater density than air operatively positioned within the enclosure defined by the tire and the wheel whereby the gaseous fluid inflating the tire is increased in density thereby increasing its heat conduction properties whereby when the tire is circulated during rotational operation thereof the temperature differential between the tread, shoulder areas, sidewalls, and rim draws closer to a medium temperature to effectively reduce the normal operating temperature of the crown and shoulder areas of the tire while increasing the normal operating temperatures of the sidewalls and rim.

References Cited by the Examiner

UNITED STATES PATENTS

| | | | |
|---|---|---|---|
| 1,436,594 | 11/1922 | McClure | 152—330 |
| 1,464,590 | 8/1923 | Trogner | 152—153 X |
| 2,026,161 | 12/1935 | Collins | 152—153 |
| 2,166,927 | 7/1939 | Brunswick | 152—153 |
| 2,339,548 | 1/1944 | Wilson. | |
| 3,113,604 | 12/1963 | Connor | 152—158 X |

ARTHUR L. LA POINT, *Primary Examiner.*

EUGENE G. BOTZ, *Examiner.*

C. W. HAEFELE, *Assistant Examiner.*